(12) United States Patent
Son et al.

(10) Patent No.: US 7,945,702 B1
(45) Date of Patent: May 17, 2011

(54) DYNAMIC ADDRESS MAPPING OF A FIBRE CHANNEL LOOP ID

(75) Inventors: Keith Son, Dublin, CA (US); Richard I. Ely, San Jose, CA (US); Wayne Booth, San Jose, CA (US); Brad Reger, Dublin, CA (US)

(73) Assignee: NetApp, Inc., Sunnyvale, CA (US)

( * ) Notice: Subject to any disclaimer, the term of this patent is extended or adjusted under 35 U.S.C. 154(b) by 1596 days.

(21) Appl. No.: 11/264,874

(22) Filed: Nov. 2, 2005

(51) Int. Cl.
*G06F 3/00* (2006.01)
*G06F 13/00* (2006.01)

(52) U.S. Cl. ................................. 710/3; 71/33
(58) Field of Classification Search ............ 710/3, 36
See application file for complete search history.

(56) References Cited

U.S. PATENT DOCUMENTS

| 7,444,437 B2* | 10/2008 | Shikada ............... 710/9 |
| 2003/0140099 A1* | 7/2003 | Beer et al. ............. 709/203 |
| 2006/0136704 A1* | 6/2006 | Arendt et al. ............. 713/2 |

* cited by examiner

*Primary Examiner* — Chun-Kuan Lee
*Assistant Examiner* — Zachary K Huson
(74) *Attorney, Agent, or Firm* — Suiter Swantz pc llo

(57) ABSTRACT

The present invention is a method and a system for dynamic mapping of a fiber channel loop ID in an ALPA loop. Based on reserved address information for the fiber channel system and a number of select ID bits for a slot ID, a dynamic drive mapping table is created. A unique address may be assigned to each drive and each controller in the ALPA loop. The created drive mapping table may be stored on logic decoding circuitry of an adaptor card coupled to each disk drive in the ALPA loop. When fiber channel loop ID signals are sent from a backplane, the fiber channel loop ID signals are translated into seven bits within an ALPA address range based on the dynamic drive mapping table. The converted signals may be sent to the disk drive coupled the adaptor card at boot up time.

20 Claims, 4 Drawing Sheets

DYNAMIC ADDRESS MAPPING OF A FIBRE CHANNEL LOOP ID

FIELD OF THE INVENTION

The present invention generally relates to the field of computer networking systems, and particularly to a method and system of dynamic mapping of a fibre channel loop ID in an Arbitrated Loop Port Address (ALPA) space.

BACKGROUND OF THE INVENTION

The Fibre Channel (FC) protocol communication standard has been developed to provide practical, inexpensive, and expandable means of transferring data between workstations, mainframes, storage devices and other peripheral devices. Fibre Channel supports different topologies, including a point-to-point topology, an arbitrated loop topology and a fabric attached topology. The arbitrated loop topology attaches devices in a loop, creating a Fibre Channel Arbitrated Loop (FC-AL). The Fibre Channel Arbitrated Loop (FC-AL) requires a unique address for each device in the loop. The unique address is called an Arbitrated Loop Physical Address (ALPA).

A single FC-AL typically supports up to 127 devices and one connection to a fabric switch may exist in a single ALPA space. Data within an ALPA space physically travels from node to node in a daisy-chain fashion, ultimately traveling in a loop. Control by a device on the loop is obtained through the process of loop arbitration, after which the device winning arbitration sends data.

In a particular FC storage system having FC-ALs, the FC storage system may communicate with several shelves. Each shelf contains several disk drives, associated control hardware, and several backplanes. Typically, legal ALPAs per a FC-AL are not sequential from 0 to 126. However, it is desirable for other parts of the FC storage system to use easy-to-understand sequential numbers for ALPA. Consequently, "select ID" (sequential from 0 to 126) may be used in the FC storage system and the Select ID may be mapped to a proper ALPA through various methods.

Some FC storage systems may allow plugging a disk drive into a backplane. If a disk drive is removed from the backplane and plugged into a different location in the backplane, the FC storage system may use the label information recorded on the drive to recognize where this drive should be mapped into its file management tables. It is important to maintain such flexibility in data security applications or for configuration expansion. Thus, some FC storage systems are physical location dependent systems to achieve such flexibility, having a physical address for each drive to remain consistent.

A Select ID signal may be used in FC storage systems to assign a physical location for each connection to a backplane, allowing the management of configuration and the simple identification of devices that need to be changed for maintenance reasons. Additionally, the Select ID signal may be able to specify a physical address for each drive. In the particular FC storage system, the Select ID signal may be a seven-bit signal sent from the backplane since a 7-bit binary number is suitable for representing the decimal numbers from 0 to 126. The Select ID signal may be used to create the binary value of the Select ID to the drive in that location.

The Select ID is mapped to the proper ALPA for a drive. The 7-bit Select ID may have two main fields: "shelf ID" which is a shelf-within-the-loop portion and "slot ID" which is a drive-slot-within-the-shelf portion. The "shelf ID" and the "slot ID" may be used to assign ALPA addresses for keeping the software simple. For example, 4 bits of the Select ID may be used for the Slot ID bits to encode up to 16 drive slots per shelf. Each drive slot may have a constant "slot ID" assigned to it by the hardware (fixed constant defined by the backplane wiring in the shelf). The remaining 3 bits of the Select ID may be used for the "shelf ID" bits. The "shelf ID" bits are determined by a user-settable switch, so the user can combine identical shelves into a single loop and then set the "shelf IDs" to unique numbers, thus making sure the Select ID for each drive is completely unique in the FC-AL loop.

The backplane may use SEL_6 through SEL_0 ID lines to send a Select ID signal. FC storage systems may assign the lower bits of the Select ID signal (i.e. Slot ID bits) by hardwiring them LOW or HIGH at each drive slot on the backplane in order to keep hardware simple. The upper bits of Select ID signal (i.e. Shelf ID bits) are typically set to be the same across all drive slots in a shelf. Thus, shelves tend to contain a number of drives that are a power of 2 or slightly less in order not to waste available ALPA addresses.

As a result, a conventional FC storage subsystem includes a shelf containing 16 disk drives, 32 disk drives, and the like. A designer may desire various numbers of disk drives per shelf, for example, 22 disk drives per shelf. In such a case, three shelves per a FC-AL may be allowed in order to preserve reserved addresses and 30 addresses may be wasted, compared to a storage subsystem having 32 disk drives per shelf. If four shelves are allowed, it is difficult to fit the address space into available ALPA addresses without reuse of reserved addresses for the FC storage subsystem. Examples of the reserved addresses include reserved addresses for a host bus adapter (HBA), electronics for SCSI Enclosure Services (SES controller), and the like. A typical FC storage system may need at least one host bus adapter (HBA) and an SES controller per shelf. In the FC storage system, the highest Select ID 126 may be reserved for a HBA and one Select ID may be assigned to each SES controller in the shelves.

Further, a designer may desire a non-fixed number of disk drives per shelf, for example, 16 disk drives per shelf now and then 22 disk drives per shelf later. In such cases, it is unavoidable to implement a complex method of ALPA address mapping through some decoding logic in the backplane or elsewhere in the drive enclosure. Typically, a card that plugs into the backplane may be used to implement a complex method of ALPA address mapping. However, this approach may require more signals lines between the backplane (the decoding logic circuit) and the drive slots, resulting in higher pin counts of the card. It is very costly and complex.

Additionally, under the FC standard, all Select IDs need to be unique in a given FC-AL. Conventional FC storage systems assign a unique Select ID to each device (e.g. each pluggable disk drive and the like). One of the conventional FC storage subsystems may include 14-16 drives per shelf. In such a system, 4 bits of the Select ID may be used for the slot ID bits to encode up to 16 drive slots per shelf. Each drive slot may have a constant "slot ID" assigned to it by the hardware (fixed constant defined by the backplane wiring in the shelf). The remaining 3 bits of the Select ID may be used for the "shelf ID" bits. The "shelf ID" bits are determined by a user-settable switch, so the user can combine identical shelves into a single loop and then set the "shelf IDs" to unique numbers, thus making sure the Select ID for each drive is completely unique in the FC-AL loop. For example, a 14-drive shelf with "shelf ID" set to 0 would have drives numbered with Select IDs from 0 to 13 (the offset of 0 for shelf 0, plus 0 to 13 for the drive slot). Shelf 1 would have drives numbered with Select IDs from 16 to 29 (the offset of 16 for shelf 1, plus 0 to 13 for the drive slot). Shelf 2 would have drives numbered from 32 to 45 (the offset of 32 for shelf 2, plus 0 to 13). Other devices in the FC-AL loop may have assigned reserved addresses. Examples of the reserved addresses include reserved addresses for a host bus adapter (HBA), electronics for SCSI Enclosure Services (SES controller), and the like. A typical FC storage system may need at least one host bus adapter (HBA) and an SES controller per shelf.

In the FC storage system, the highest Select ID 126 may be reserved for a HBA. In order not to reuse reserved addresses, the block of Select IDs based on the last "shelf ID" may be reserved. In other words, the entire Select IDs in the range of the last "shelf ID" may be reserved and not to be used by disk drives. As described above, a FC storage system including 16-drive shelves typically uses 3 bits of the Select ID for the "shelf ID". Thus, eight "shelf IDs" may be available per FC-AL. Since the highest "shelf ID" (or a block of 16 Select IDs) may be reserved, seven "shelf IDs" may be available for shelves per FC-AL. Consequently, the FC storage system may be allowed to include 7 shelves and 7*16=112 total disk drives per FC-AL. Each SES controller in the shelf may need one Select ID. The FC storage system may be able to use 112 (for disk drives)+7 (for SES controllers)=119 total Select IDs without reusing the reserved block of Select ID.

However, a certain FC storage system may include a larger size shelf, such as a 32-disk shelf, and the like. In such a system, the 7-bit Select ID may be split into 5 bits of "slot ID" (32 slots) and 2 bits of "shelf ID" (up to 4 shelves). The highest "shelf ID" may be reserved for a HBA and, as a result, a block of 32 Select IDs associated with the highest "shelf ID" may be reserved and not supposed to be used by disk drives. The FC storage system may be allowed to have three shelves and 3*32=96 total disk drives per FC-AL. In this manner, the reserved block of 32 Select IDs may not be reused. However, a significant chunk of Select IDs is wasted. As such, when the FC storage system includes shelves with the number of disk drives being a power of 2, such as 16, 32, 64 and the like, the larger the shelf is (the more disk drives per shelf), the more Select IDs (i.e more ALPA addresses) the FC storage system wastes due to the size of the reserved block of Select IDs.

Therefore, it would be desirable to provide a method and system for mapping the Select ID signal in available ALPA addresses without wasting a significant chunk of available ALPA addresses for a FC storage subsystem having non-fixed numbers of disk drives per each shelf. It would be also desirable to provide such a method and system for mapping the select ID signal in available ALPA addresses through use of a small number of signal lines. It would also be desirable to provide a method and system for assigning a unique Select ID to a FC storage device so as to maintain desirable numbers of disk drives in a given FC-AL while preserving reserved Select IDs and providing a method and system for maximizing use of resources in the FC-AL.

SUMMARY OF THE INVENTION

Accordingly, the present invention provides a method and a system for dynamic mapping of a fibre channel loop ID in ALPA addresses for a storage subsystem having various numbers of disk drives for each shelf. The present invention may create a dynamic drive mapping table for changes in the storage system and thus required minimal changes on back panel hardwires connected to a switch selecting a shelf ID (a shelf ID select switch).

In an aspect of the present invention, a method for dynamic mapping of a fibre channel select ID for a storage subsystem is provided. The method may retrieve reserved address information for the storage subsystem. A number of select ID bits which are utilized for a slot ID of a designated disk drive on each shelf may be determined. The method may determine whether a dynamic drive mapping table is necessary. If the dynamic drive mapping table is necessary, the dynamic drive mapping table may be created based on the reserved address information and the number of select ID bits for the slot ID. A unique address may be assigned to each drive and each controller in the ALPA loop. The created dynamic drive mapping table may be stored on logic decoding circuitry of an adaptor card coupled to each disk drive.

In an additional aspect of the present invention, when fibre channel loop ID signals are sent from a backplane to an adaptor card coupled to a designated disk drive, the fibre channel loop ID signals may be translated into seven bits within an ALPA address range based on the dynamic drive mapping table. The converted signals may be sent to the designated disk drive. In this manner, the backplane may have minimal hardwires coupled to a shelf ID select switch, having few Select ID lines connected to all disk drives.

In a further aspect of the present invention, a storage subsystem for dynamic mapping of a fibre channel loop ID (a select ID) in ALPA addresses may be provided. The storage subsystem may include several FC-ALs each of which has an exclusive address space. The storage subsystem may include several backplanes for receiving a slot ID and a shelf ID and shelves coupled to its associated backplane. The backplanes may be connected via a FC-AL. Depending on the storage subsystem architecture; each shelf may include various numbers of disk drives which are coupled to adaptor cards. Each adaptor card may store a dynamic drive mapping table. Each backplane is capable of sending a fibre channel loop ID to an adaptor card coupled to a designated disk drive. When the adaptor card receives the fibre channel loop ID, it may translate the fibre channel loop ID to a different loop ID based on the dynamic drive mapping table which may be sent to the designated disk drive.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention is directed to a method and a system for dynamic mapping of a fibre channel loop ID in ALPA addresses for a storage system having various numbers of disk drives for each shelf. The present invention may create a dynamic drive mapping table for changes in a number of disk drives of the storage system and thus allow a backplane to have minimal hardwires coupled to a switch for selecting shelf ID. Consequently, the present invention may provide a cost effective solution for the storage system having various numbers of disk drives for each shelf.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail to prevent obscuring the present invention.

Figure 1:
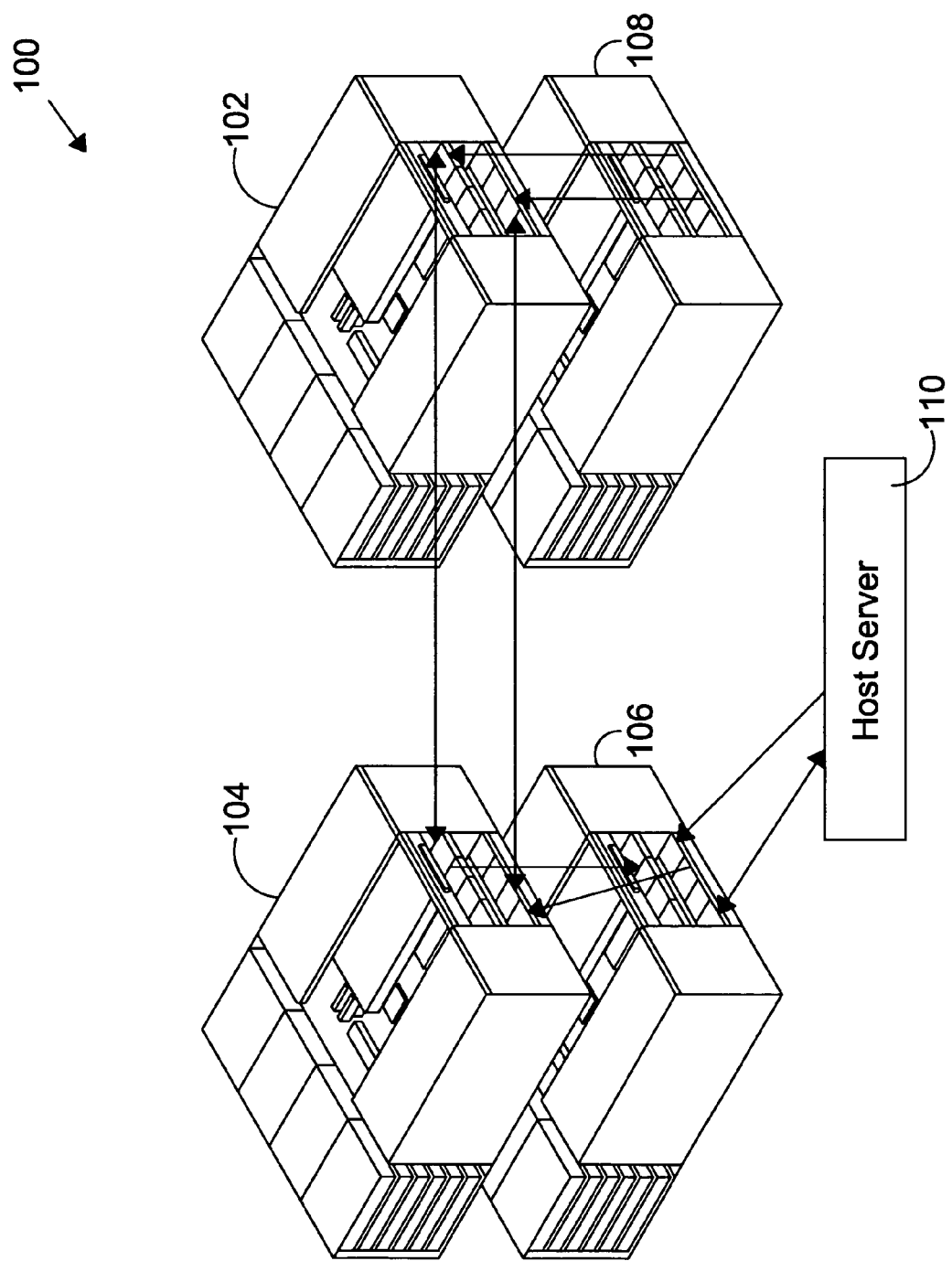
FIG. 1 illustrates a schematic block diagram of storage systems coupled to a host server in accordance with an exemplary embodiment of the present invention.

Referring now to FIG. 1, a schematic block diagram 100 of exemplary storage subsystem including multiple shelves is depicted. Multiple shelves 102-108 may have fibre channel connectivity to a host server 110. In an embodiment of the present invention, the multiple shelves 102-108 may have fibre channel connectivity to a filer head (not shown). For example, a particular FC storage system may comprise, but not limited to, a hardware platform which includes a filer head containing CPU, memory, RAM, and the like. The file head may be communicatively coupled to a storage subsystem having multiple shelves containing several disk drives and associated control hardware. The multiple shelves may be connected to the filer head with several Fibre Channel Arbitrated Loops (FC-ALs), each of which has an exclusive address space. It is to be noted that the desirable number of disk drives and shelves for a particular storage system may be inherently limited by the limitation of an ALPA space. For example, in a particular embodiment, each shelf in the storage system may contain 24 disk drives (such as ATA hard drives and the like). When seven select ID signals from backplane are converted into ALPA addresses, 126 addresses are available per FC-AL. In the particular embodiment, several addresses may be reserved to meet the Fibre channel standard requirement by ANSI X3T11 task group to define a serial I/O channel for interconnecting a number of heterogeneous peripheral devices to computer systems as well as interconnecting the computer systems themselves through optical fiber and copper media at gigabit speeds. For example, lower eight addresses (address 0-7) may be reserved for Small Computer System Interface (SCSI) initiators and the highest (address 126) for a Fibre Channel switch. The SCSI initiators are devices in the serial I/O channel issuing commands. In such case, 118 addresses may be available for the shelves. In the particular embodiment, each shelf may use 24 addresses for disk drives and 2 addresses for controllers. Each of the FC-ALs may be capable of supporting up to four shelves.

Each shelf may also include a Controller Module (such as Serial-ATA Controller Module (SCM), or the like). For example, the SCM may be utilized to bridge from FC (Fibre Channel) to Serial-ATA (S-ATA). The FC loop may connect the SCM on the rear of the shelf. The Controller Module may be connected into the rear side of the backplane. In the particular embodiment, the front side of the backplane provides 24 individual connections for each disk drive. An adapter card may be communicatively coupled to each disk drive to complete an address mapping.

Figure 2:
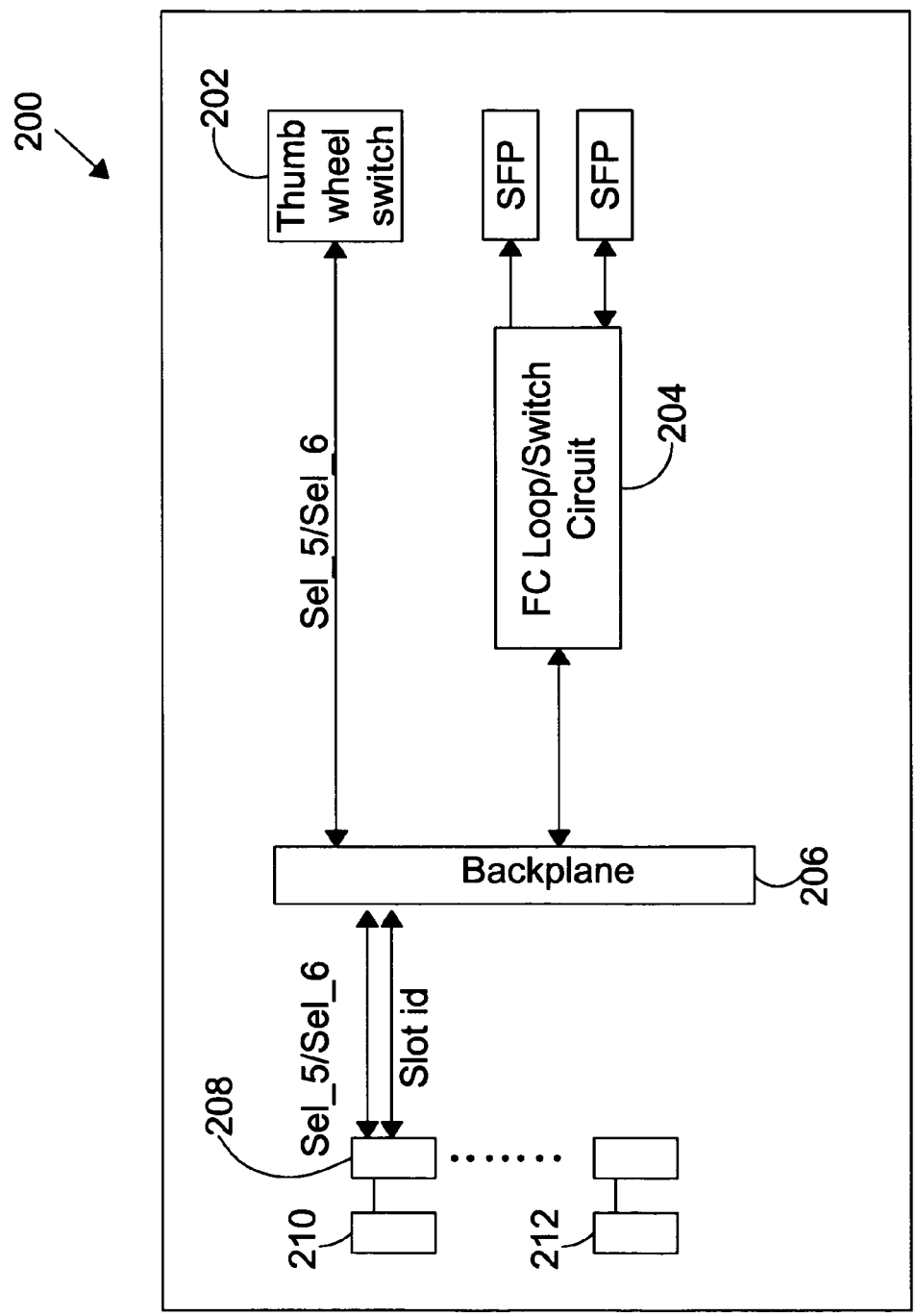
FIG. 2 illustrates a block diagram of an internal board layout for dynamic mapping of a FC loop ID for the storage system shown in FIG. 1.

Referring now to FIG. 2, a schematic block diagram of an exemplary shelf 200 is depicted. The shelf 200 may include several disk drives 210, 212 and a backplane 206. The backplane 206 may provide multiple individual connections of each disk drive 210. Each disk drive 210 may be coupled to an adaptor card 208 which may translate control signals. The adaptor card 208 may be a circuit board (panel board) configured to decode control signals.

The backplane 206 may receive shelf ID signals from a shelf ID select switch 202 (such as a Thumbwheel switch which is a manually operable shelf ID select switch, or the like). A FC Loop/Switch circuit 204 may send slot ID signals to the backplane 206. The backplane may combine the shelf ID signals and the slot ID signals to generate a FC loop ID (e.g. select ID, or the like) signal. The FC loop ID (select ID) signal may be sent from the backplane 206 to the adaptor card 208 coupled to a designated disk drive.

For example, the backplane 206 may receive Sel_5 and Sel_6 signals from a shelf ID select switch 202. In one embodiment of the invention, a FC Loop/Switch circuit 204 may send five bit signals including Sel_0, Sel_1, Sel_2, Sel_3, and Sel_4 to indicate which drive slot on the backplane 206 will be designated. Consequently, a select ID signal including seven SEL_x bits may be sent from the backplane 206 to the adaptor card 208.

In a particular embodiment, the storage system may include 24 disk drives for each shelf. In such a case, four shelves including 24 disk drives may be allowed to be connected in a FC loop since ALPA supports 126 addresses. Typically, the storage system may reserve few addresses for initiators and switch ports. For instance, the first lower 8 addresses are reserved for the initiators and the highest ID (126) is reserved for switch ports. The lower 5 bits of a select ID may be reserved for a slot ID and the upper 2 bits a select ID may be used for a shelf ID.

In order to reserve addresses for initiators and switch ports without creating complicated hardwires connected to the shelf ID select switch on the backplane, a dynamic drive mapping table may be created to translate a select ID signal to an address within available ALPA addresses (e.g. from 8 to 125 in the particular embodiment). In a preferred embodiment, the dynamic drive mapping table may be stored in logic decoding circuitry on each adaptor card in the storage system. The logic decoding circuitry may a combination of several programmable logic gates. In an embodiment of the present invention, the dynamic drive mapping table may be reprogrammable within the logic decoding circuitry whenever a new dynamic drive mapping table is required. The lower 5 select ID bits may be hardwired from 0 to 23 on the backplane 106. The upper two bits may come from the thumbwheel switch (the shelf ID select switch) 102 with two bits giving 0, 1, 2, or 3.

In an embodiment of the present invention, two Select ID lines from the shelf ID select switch is suitable for being bused to all drives in a shelf when the dynamic drive mapping table translates the select ID signal to an address within available ALPA addresses. In the embodiment, the backplane may utilize two hardwires from the shelf ID select switch for the FC loop ID mapping. As such, the backplane may be designed to have minimal hardwire connected to the shelf ID select switch.

An exemplary dynamic drive mapping table for the particular embodiment may be created as shown below:

| Shelf ID | | Drive 0:<br>SEL_4,3, | | Drive 23:<br>SEL_4,3, | Controller<br>A | Controller<br>B |
|---|---|---|---|---|---|---|
| SEL_6 | SEL_5 | 2,1,0) | ... | 2,1,0) | | |
| 0x0b | 0x0b | 16 | | 39 | 40 | 41 |
| 0x0b | 1x0b | 44 | | 67 | 68 | 69 |
| 0x1b | 0x0b | 72 | | 95 | 94 | 97 |
| 0x1b | 0x1b | 100 | | 123 | 124 | 125 |

It is to be noted that the above exemplary dynamic drive mapping table is described for illustrative purposes. Those of ordinary skill in the art will appreciate that there are various ways to create a dynamic drive mapping table suitable for the storage subsystem having FC-AL connectivity in accordance with the present invention.

In one embodiment, a designated adaptor card would receive the seven SEL_x (e.g. SEL_0, SEL_1, SEL_2, SEL_3, SEL_4, SEL_5, and SEL_6) signals from the backplane and convert them to a different loop ID of seven bits according to the dynamic drive mapping table and send them to a disk drive coupled to the designated adaptor card at boot up time.

Figure 3:
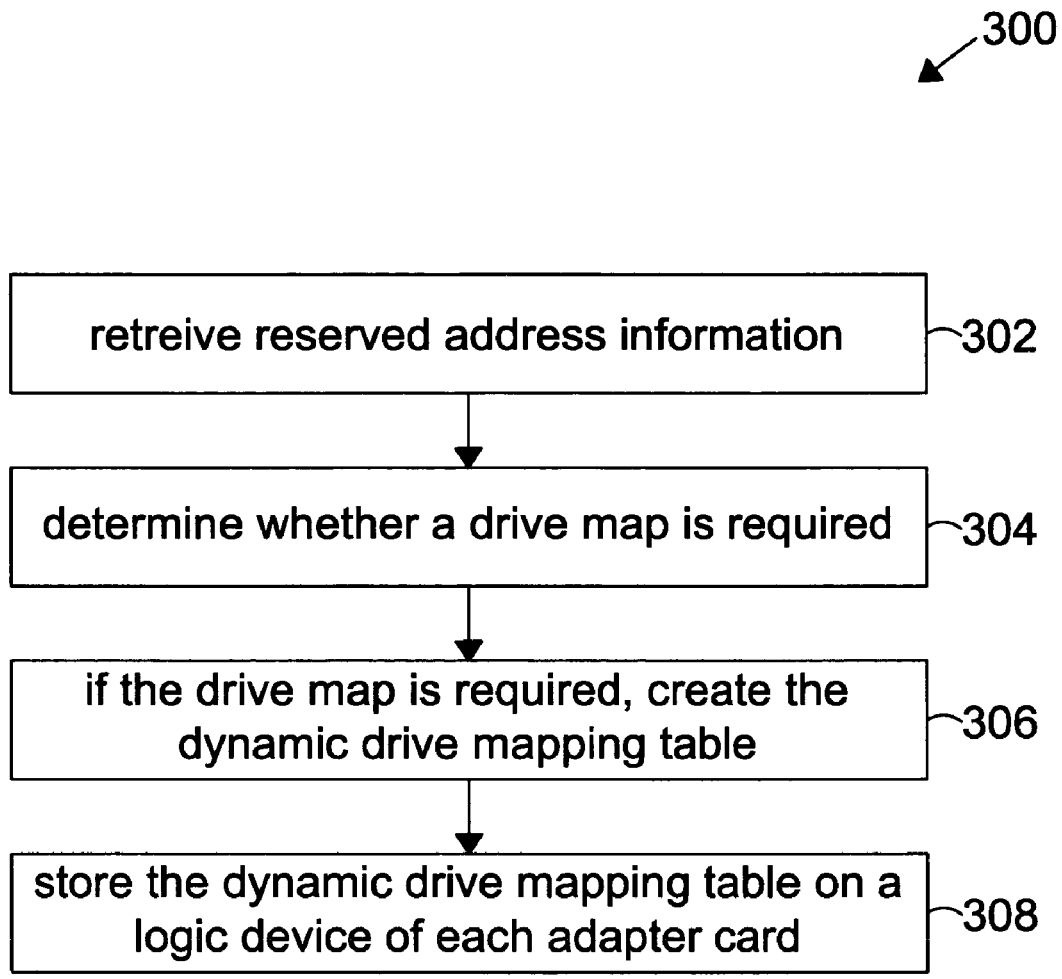
FIG. 3 is a flow diagram of a method for creating a dynamic drive mapping table in accordance with an exemplary embodiment of the present invention.

Referring now to FIG. 3, a flow diagram 300 of a method for creating a new dynamic drive mapping table is depicted. In step 302, reserved address information for the storage system may be retrieved. Typically, the FC storage system may reserve several ALPA addresses in order to conform to the FC standard (ANSI X3T11). For instance, first lower 8 addresses (ALPA address 0, 1, 2, 3, 4, 5, 6, and 7) are reserved for the SCSI initiators and the highest ID (ALPA address 126) is reserved for the fibre switch port. The reserved address information may be stored in memory of an adaptor card. Alternatively, the reserved address information may be stored in non-volatile memory, flash memory or the like in the file header of the storage system. The reserved address information may be provided from a user through a recoding medium (e.g. floppy disk, CD ROM, DVD ROM, or the like), a keyboard input, or the like to the host server coupled to the storage subsystem.

A number of select ID bits to represent a slot ID may be determined based on a number of disk drives on a shelf. For example, if each shelf includes 14 disk drives, 4 select ID bits are required for a slot ID while 5 select ID bits are required for a slot ID if each shelf includes 24 disk drives. As such, the method may determine whether a dynamic drive mapping table is to be created for the storage system in step 304. The dynamic drive mapping table is required when the select ID bits for a slot ID indicates that an overlapped use of the reserved addresses (i.e. reuse of the reserved address by disk drives) may be present in the FC-AL. Accordingly, the dynamic drive mapping table for the storage system will be created based on the reserved address information and the number of select ID bits in step 306. A unique address within available ALPA addresses may be assigned to each drive and each controller in the ALPA loop. Thus, the dynamic drive mapping table may ensure that there is no overlapping use of reserved addresses. As describe above, reserved addresses may be used for SCSI initiators, a fibre switch port, and the like. The created dynamic drive mapping table may be stored on the logic decoding circuitry of each adaptor card coupled to a disk drive in the ALPA loop 308.

In a particular embodiment, the method may be implemented by the FC storage system having the NETAPP® DATA ONTAP™ operating system installed on a hardware platform that includes a filer header and communicatively coupled to the storage subsystem including several shelves in FC-ALs.

Figure 4:
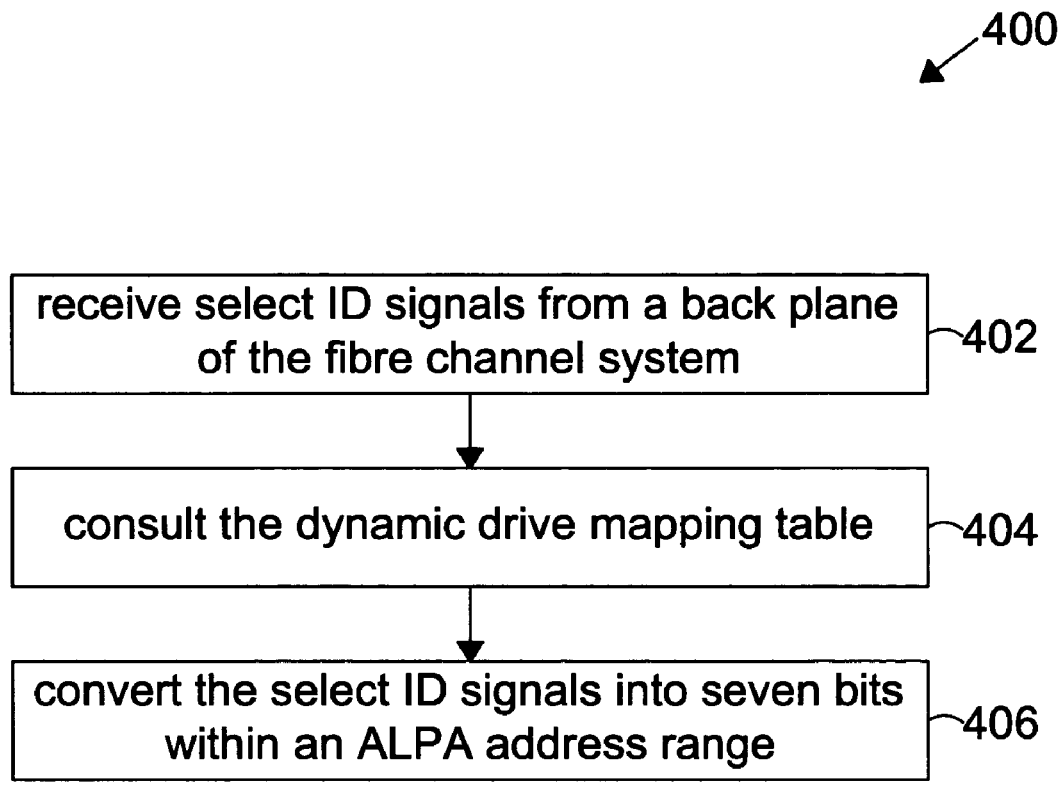
FIG. 4 is a flow diagram of a method implemented in accordance with an exemplary embodiment of the present invention.

Referring now to FIG. 4, a flow diagram 400 of a method implemented in accordance with the present invention is depicted. The method may start with a step receiving seven SEL_x (e.g. SEL_0, SEL_1, SEL_2, SEL_3, SEL_4, SEL_5, and SEL_6) signals from the backplane 402. When the select ID signals are sent from a backplane to a designated adaptor card, the select ID signals are translated into seven bits within an ALPA address range based on the dynamic drive mapping table. The method may consult the dynamic drive mapping table stored on the logic decoding circuitry of the designated adaptor card 404. The received seven SEL_x signals may be translated into seven bits within an ALPA address range based on the dynamic drive mapping table 406. The converted signals may be sent to a disk drive coupled to the designated adaptor card at boot up time.

In an embodiment, the ALPA address for the devices attached to the fabric port on the shelf may be predetermined by the dynamic drive mapping table in order to simplify fabric routing. The ALPA values may be contiguous among drives in each shelf. The strategy is to allocate numerically similar ALPA ranges to fabric ports to simplify routing. Advantageously, the present invention allows various numbers of shelves with various numbers of drives to be attached in an ALPA loop without interfering with reserved addresses. Additionally, the present invention may utilize two Select ID lines bused to all drives so that the backplane does not need additional hardwires connected to the shelf ID select switch for the FC loop ID mapping. Accordingly, the present invention may provide a cost effective solution for the storage system since each backplane may be designed to have minimal hardwire connected to the shelf ID select switch. In an alternative embodiment of the present invention, a controller card may be utilized to send the upper two bits to every drive.

In the exemplary embodiments, the methods disclosed may be implemented as sets of instructions or software readable by conventional general purpose digital computers. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

What is claimed is:

1. A method for dynamic mapping of a fibre channel select identifier (ID) in Arbitrated Loop Port Address space for a storage subsystem including a plurality of disk drives, comprising:

retrieving reserved address information;
determining a number of select ID bits for a slot ID;

determining whether a dynamic drive mapping table is required to avoid an overlapped use of reserved addresses;

creating the dynamic drive mapping table based on the reserved address information and the number of select ID bits for a slot ID when the overlapped use of a plurality of reserved addresses is present; and storing the created dynamic drive mapping table on logic decoding circuitry of each adaptor card of a plurality of adaptor cards, each disk drive of the plurality of disk drives coupled to a separate adaptor card of the plurality of adaptor cards, wherein the select ID signals are sent from a backplane to each adaptor card coupled to a designated disk drive.

2. The method as described in claim 1, wherein the dynamic drive mapping table is reprogrammable to be stored on the logic decoding circuitry.

3. The method as described in claim 1, further comprising:
converting the select ID signals sent from the backplane into seven bits within an Arbitrated Loop Port Address range, based on the dynamic drive mapping table.

4. The method as described in claim 1, creating the dynamic drive mapping table step further comprising:
assigning a unique address for each drive; and
assigning a unique address for each controller.

5. The method as described in claim 4, wherein the unique addresses for each drive and each controller are not overlapped with the reserved addresses.

6. The method as described in claim 5, wherein the reserved addresses are included in the reserve addresses information.

7. The method as described in claim 3, further comprising:
sending the converted signals to the designated disk drive.

8. The method as described in claim 1, wherein the select ID signals include seven bits.

9. The method as described in claim 2, wherein the dynamic drive mapping table is reprogrammed if there is a change in a number of disk drives included in each shelf.

10. A system for dynamic mapping of a fibre channel select identifier (ID) in Arbitrated Loop Port Addresses for a storage subsystem including a plurality of Fibre Channel Arbitration Loops, the system comprising:
means for retrieving information of reserved addresses;
means for determining a number of select ID bits for being utilized to select a designated fibre channel drive;
means for creating the dynamic drive mapping table based on the reserved address information and the number of select ID bits and saving the dynamic drive mapping table on logic decoding circuitry of each adaptor card of a plurality of adaptor cards, each disk drive coupled to a separate adaptor card of the plurality of adaptor cards, when the number of select ID bits indicates that an overlapped use of the reserved addresses is present in at least one of the plurality of Fibre Channel Arbitration Loops; and
means for sending the select ID signals from a backplane to each adaptor card coupled to a designated disk drive, wherein each of the plurality of Fibre Channel Arbitration Loops has an exclusive address space.

11. The system as described in claim 10, further comprising:
means for converting the received select ID signals from the backplane into seven bits based on the dynamic drive mapping table,
wherein the converted seven bits are within an available Arbitrated Loop Port Address range.

12. The system as described in claim 10, the creating the dynamic drive mapping table step means further comprising:
means for assigning a unique address for each disk drive and each controller in the storage subsystem.

13. The system as described in claim 12, wherein the unique address is not overlapped with reserved addresses.

14. The system as described in claim 11, further comprising:
sending the converted signals to the designated disk drive from the adaptor card.

15. The system as described in claim 10, wherein the select ID signals include slot ID signals and shelf ID signals.

16. A storage subsystem capable of dynamic mapping of a fibre channel loop identifier (ID) wherein the storage subsystem has a plurality of reserved addresses, the storage subsystem comprising:
a plurality of backplanes for receiving a slot ID and a shelf ID;
a plurality of shelves coupled to the plurality of backplanes, each of the plurality of shelves including a plurality of disk drives, each individual disk drive being coupled to a separate adapter card of a plurality of adaptor cards, each of the plurality of adaptor cards including logic decoding circuitry for storing a dynamic drive mapping table;
a fibre channel loop switch control coupled to the plurality of backplanes, the fibre channel loop switch control for sending signals for the slot ID to the plurality of backplanes; and
a shelf ID select switch coupled to the plurality of backplanes, the shelf ID select switch for sending the shelf ID signals to the plurality of backplanes,
wherein each of the plurality of backplanes is capable of sending a fibre channel loop ID to a designated adaptor card and the fibre channel loop ID includes the received slot ID and shelf ID.

17. The storage subsystem as described in claim 16, wherein the designated adaptor card converts the received fibre channel loop ID to a different loop ID based on the dynamic drive mapping table.

18. The storage subsystem as described in claim 16, wherein the dynamic drive mapping table is created to avoid an overlapped use of the plurality of reserved addresses.

19. The storage subsystem as described in claim 17, wherein the different loop ID is sent to a disk drive coupled to the designated adaptor card.

20. The storage subsystem as described in claim 17, wherein the disk drive converts the different loop ID to a unique address for each drive and controller within available Arbitrated Loop Port Addresses.

* * * * *